United States Patent Office

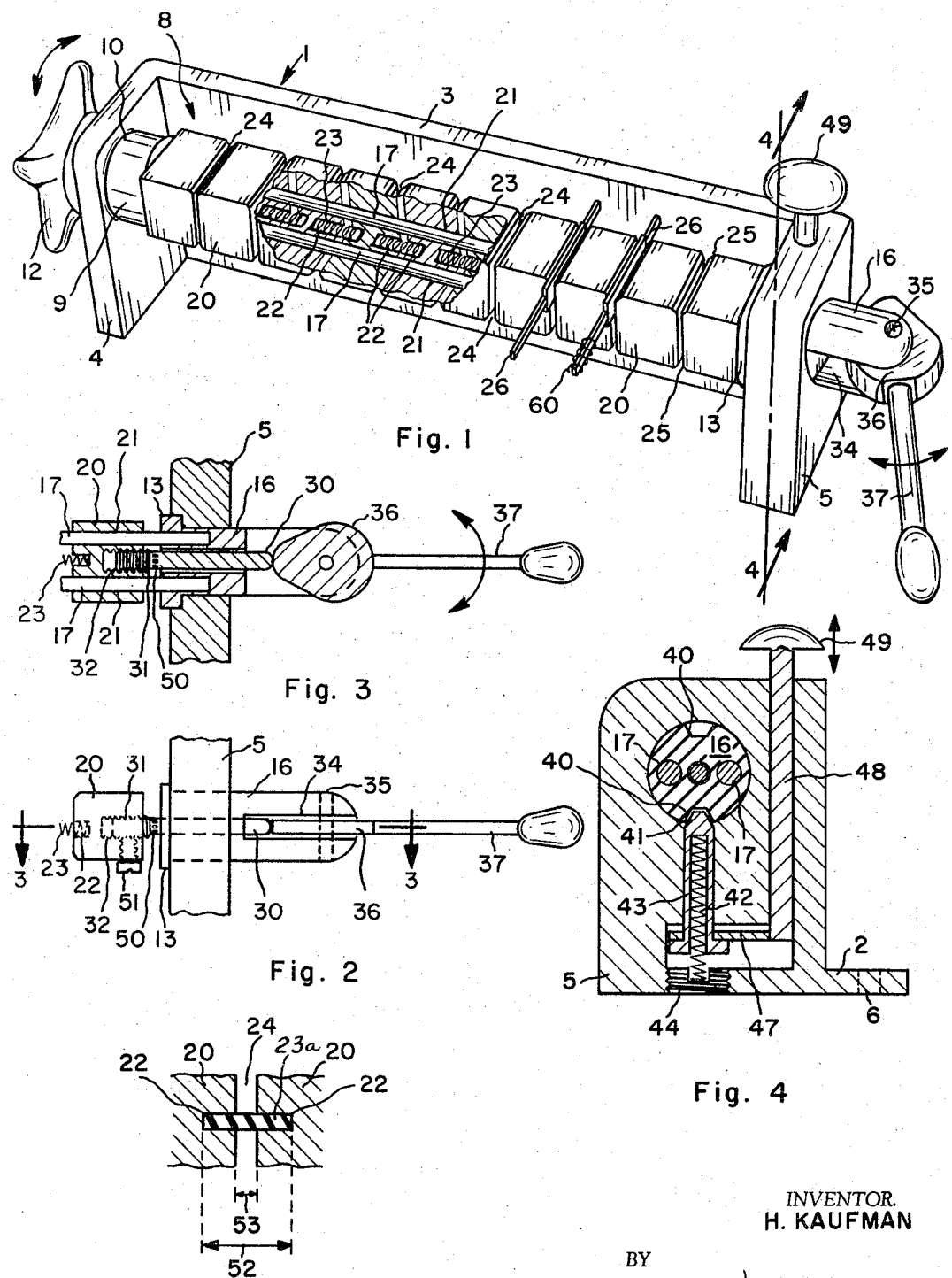

3,312,460
Patented Apr. 4, 1967

3,312,460
HOLDING DEVICE FOR TESTING
CONNECTIONS
Harry Kaufman, New Rochelle, N.Y., assignor to O.K.
Machine and Tool Corporation, Bronx, N.Y., a corporation of New York
Filed Nov. 15, 1963, Ser. No. 323,993
10 Claims. (Cl. 269—70)

This invention relates to a testing device, and in particular to a holding device useful in the testing of a solderless, wrapped electrical wire connection.

A recently developed technique for attaching or connecting a wire to a terminal is known as solderless wrapped connections. See Bell Laboratories Record, August 1955, pages 281–284. In this technique, a tool, generally power driven, is provided which fits over the terminal and which wraps any inserted wire tightly around the terminal. Often the wrapping tool also automatically strips the insulation from the wire end. Excessive wear of parts of the wrapping tool after prolonged use results in a too loose wrapped wire, which may be unsatisfactory as an electrical connection, or in a too tight wrapped wire, exhibiting poor mechanical properties. To determine when these conditions arrive, indicating replacement or repair of worn parts of the wrapping tool or of the tool itself, it is conventional to test periodically the wrapped connection by so-called unwrap and pull tests. In the latter test, for instance, a device with attached pull-measuring gauge is used to pull the wrapped wire off a terminal, and the measured amount of force required to remove the wire is an indication of the operation of and the wear of the wrapping tool. To this end, it is desirable to mount separate terminals in a separate holding device while the wrapped wire connections are made and tested thereon.

One object of the invention is a holding device for testing plural elements, which device is simple to operate and enables the testing to be performed rapidly and efficiently.

Another object of the invention is a holding device for use in testing solderless, wrapped wire connections to plural terminals.

Still a further object of the invention is a holding device for receiving and tightly holding plural terminals while solderless, wrapped wire connections are applied thereto and tested, and enabling the test terminals to be quickly and easily removed.

Still another object of the invention is a holding device adapted for receiving and tightly holding plural terminals of varying thickness to enable wrapped wire connections to be made thereto.

Another object of the invention is a holding device comprising an assembly of aligned movable blocks with means for urging the blocks toward one another to clamp test terminals inserted between the blocks, together with means for rotating the assembly and for separating the blocks allowing easy removal of the inserted terminals when the testing is completed.

A further object of the invention is a holding device affording an assembly of slideable blocks with means for clamping the blocks together to lock in place between the blocks double-ended test terminals, in combination with means for rotating the assembly while the blocks remain clamped whereby both ends of the test terminals are available to apply connections thereto.

Still a further object of the invention is a holding device comprising an assembly of adjacent, resilient member or spring-separated, displaceable blocks arranged on a rotatable mandrel with means for overcoming the resilient or spring forces and clamping the blocks together to lock plural terminals in place between the block, and with provision made for locking the mandrel against rotation and for unlocking the mandrel enabling it to be rotated 180°.

These and other objects, features and advantages of this invention will become more apparent by reference to the following detailed description of several embodiments of the invention, taken in conjunction with the accompanying drawing, wherein.

FIG. 1 is a perspective view of one form of testing device in accordance with the invention with regions broken away to show interior details;

FIG. 2 is a front elevational view of the right end of the device illustrated in FIG. 1 with the guide rods removed;

FIG. 3 is a cross-sectional view through the center of the device portion illustrated in FIG. 2 with the guide rods restored;

FIG. 4 is a cross-sectional view of the device illustrated in FIG. 1 along the line 4—4;

FIG. 5 is a cross-sectional view of several of the blocks of a modified construction.

Referring to FIG. 1, there is illustrated therein one form of holding device in accordance with this invention specifically adapted for testing the pull-off force or the unwrapping of a solderless, wrapped wire connection on a terminal, to indicate the effectiveness of the wire wrapping tool. Experience has shown that, for best results, a single test performed on a single connection is inadequate. A large number of connections must be made and all be able to survive the pull-off or unwrap test to ensure a high degree of probability that subsequent connections made by the same wrapping tool will be satisfactory. To this end, the holding device of the invention is adapted to hold a large number of terminals, which preferably are double-ended so that connections may be made to both ends.

In the form shown in FIG. 1, the device comprises a housing or support 1 comprising a base 2 (see FIG. 4), a rear upstanding wall 3, and side upstanding walls 4 and 5. The base 2 extends rearwardly beyond the rear wall 3 and is provided with holes 6 (only one of which is shown) by which the device may be bolted or otherwise secured to a suitable table. A shaft or mandrel, indicated generally by reference numeral 8, is journaled in the two side walls 4, 5 for free rotation therewithin. The mandrel 8 comprises a cylindrical journal member 9 which seats and rotates within a correspondingly-shaped cavity 10 in the left side wall 4, and integral therewith a shaft of reduced diameter (not shown) which extends through and beyond the left side wall 4. A knob 12 is mounted on the shaft end for rotating same and thus the entire mandrel 8.

Another cylindrical journal member 13 is provided at the right end of the mandrel 8. It too comprises a large diameter cylindrical portion which seats and rotates within a correspondingly-shaped cavity of the right side wall 5, and which reduces in diameter to an integral cylindrical extension piece 16 which extends through and beyond the right side wall 5. Connecting together the opposed cylindrical members 9 and 13 are two guide rods 17 whose ends are press-fitted or otherwise secured in appropriate holes provided along a diameter of each cylindrical member 9, 13 but on opposite sides of the center thereof. The cylindrical members 9 and 13 are coaxial with one another, and the two guide rods 17 extend parallel to and on opposite sides of the common axis. The assembly of the coaxial, cylindrical members 9, 13 and the guide rods 17 form a rigid assembly rotatable together as a single unit.

Mounted on the guide rods 17 are a plurality of terminal holding blocks 20, ten of which are shown in the drawing. Each of the blocks 20 has a pair of clearance holes 21 extending completely through the blocks on opposite sides of the center thereof, enabling the blocks to be freely displaced, but without tilting or rocking, along the guide rods 17. Each of the blocks 20 also contain a pair of coaxial, back-to-back, blind holes 22 at the center thereof. A plurality of balanced compression springs 23 are provided, each seated in opposed blind holes 22 of adjacent pairs of blocks 20. In the specific case illustrated, with ten blocks 20, nine compression springs 23 are provided. The springs 23 are designed to be under compression, so that they urge the block 20 apart from one another to form plural—in this case, nine—spaces 24 between the blocks 20 and above and below the guide rods 17 for receiving test terminals, one in each space. The upper and lower block corners are bevelled 25 for ease of insertion of the terminals. The mandrel 8 and block 20 dimensions are chosen so that the terminal end engages the rear wall 3 when properly mounted between the blocks 20. Several terminals 26 are shown in FIG. 1 inserted in position in the receiving spaces 24. The terminals 26 fit freely within the receiving spaces 24 in their open position as illustrated in FIG. 1, and rest on the two guide rods 17.

Means are provided to urge the blocks toward one another to close up the receiving spaces 24 and lock the terminals 26 tightly between the blocks 20. These means include a follower pin or rod 30 (see FIGS. 2 and 3) whose left end 31 is threaded and engages a threaded blind hole 32 in the end block 20 at the right side. The follower rod 30 passes freely through a center clearance hole in the cylindrical extension piece 16 and terminates therewithin. The extension piece 16 is bifurcated forming a space 34 within which extends the follower rod 30. Pivoted 35 on the bifurcated piece 16 is a cam member 36 with attached operating handle 37. The cam 36 is shaped to engage the follower rod 30, and is dimensioned so that when the handle 37 is axially arranged with the mandrel 8, as shown in FIG. 3, the follower rod 30 is urged to its inmost position, pushing its associated block 20 toward the adjacent block 20, which force is then transmitted to the left by the intervening compression springs 23 along the whole block assembly, strongly urging all the blocks 20 toward the left end of the assembly and thus toward each other, tightly clamping any inserted terminals 26 in position between the blocks 20. When the handle 37 is pivoted or moved, in either direction, off its axial position, as shown in FIG. 1, the follower rod 30 is disengaged causing the blocks 20 to spread apart by virtue of the intervening compression springs 23.

The handle 37 and cam 36 rotates with the mandrel 8. The assembly can be locked in positions 180° apart, and selectively rotated between the two locked positions by means which are more clearly illustrated in FIG. 4. As will be noted, the outer surface of the extension piece 16 contains opposed conical depressions or recesses 40 adapted to receive the similarly-shaped conical end 41 of a spring 42 loaded, hollow plunger 43. The plunger 43 is mounted vertically within a cavity in the right side wall 5 beneath the axis of the mandrel 8, with its conical end 41 pointing upward. The spring 42 is mounted within the plunger 43 and is maintained in compression by a screw 44 mounted at the bottom of the side wall 5 and providing access to these elements. The spring 42, as will be clear from the drawing, urges the plunger 43 upward against the extension piece 16 which it engages. The plunger 43 has clearance space at its back for downward movement to clear the extension piece 16. This movement is obtained by a transverse rod 47 which is secured to the end of the plunger 43. The rod 47 is in turn secured to a vertically-extending rod 48 which rises above the support 1, and on which a button or knob 49 is provided. Under normal conditions, the mandrel 8 is locked in position preventing rotation with the blocks 20 arranged as shown in FIG. 1 with the receiving spaces 24 horizontal. Depression of the button 49 moves the rods 47 and 48 downward, withdrawing the plunger 43 from its seat in a recess 40. This allows the mandrel 8 to rotate freely in either direction so long as the button 49 remains depressed. When the button 49 is released, its cam end 41 is urged against the surface of the extension piece 16, still allowing rotation of the mandrel 8, until one of the recesses 40 is engaged, whereupon the plunger 43 moves inward into the recess 40 locking the mandrel 8 against further rotation.

In operation, the normal position of the mandrel is illustrated in FIG. 1. It is locked in position preventing rotation, and the handle 37 is in its release position. The operator inserts in the open receiving spaces 24 between the blocks 20 nine terminals 26, which may be doubled ended. The terminals 26 rest on the two guide rods 17 and butt against the rear wall 3. Then the handle 37 is moved axially to its locking position clamping the terminals 26 in position. The operator then wraps nine wire connections on the protruding terminal ends with the wrapping tool, one connection of which is shown schematically in FIG. 1 at 60. Next, the operator subjects the connections to the unwrap or pull test, and usually records the measured force required to remove the connections from the clamped terminals. Following this, the operator depresses the button 49, and uses the knob 12 at the left end to rotate the locked mandrel 8 180° to its other locking position, the button 49 automatically returning to its up position. Then the wire wrapping and unwrap and pull tests may be repeated on the opposite terminal ends, which terminals are now on the underside of the blocks 20. After completion of these steps, the handle 37 is moved to its release position, unclamping the terminals 26 and allowing them to fall downward through an opening desirably provided on the table underneath into a suitable container. This now makes available the upper receiving spaces 24 for receiving a new set of terminals for subsequent testing.

To accommodate terminals of varying thickness, which will require different sized receiving spaces 24, the follower rod 30 is made adjustable. Several spanner holes 50 are provided along its circumference at a region adjacent the right side wall 5. By means of a spanner wrench applied in the space, the follower rod 30 can be rotated, affording a small increase or decrease in the size or thickness of the receiving spaces 24, to compensate for small changes in the terminal thickness. A locking set screw 51 is provided to lock the follower 30 in its adjusted position. This is important not only for receiving terminals of varying thickness, but also for receiving terminals of two or more different thickness at the same time.

It will be clear from the foregoing that the device of the invention provides for simple, rapid testing of the wire connections to terminals. The movements required of the operator are minimized. The device is rugged, yet will accommodate terminals of varying thickness.

While the embodiment illustrated has provision for nine terminals, it will be clear that the device can be readily adapted to receive a lesser or a greater number. The holding blocks need not have the precise shape illustrated but are adapted for the configuration of terminal to be employed in the test. The compression springs between the blocks are arranged to maintain the blocks evenly spaced apart.

In the embodiment illustrated in FIGS. 1 to 4, compression springs 23 are employed between the blocks 20 to space them apart in order to release the terminals after the tests have been completed. Unless care is exercised in the control of the spring tension, the blocks 20 may not separate smoothly and evenly, and some of the terminals may not freely fall from their receiving spaces and may require assistance from the operator. FIG. 5 illustrates a preferred modification in which these possibilities are eliminated, and in which the blocks 20 completely separate from one another when the handle 37 is released, and the separations are even, enabling all the terminals in the bottom receiving spaces to be immediately released and fall by gravity off the device. These results are obtained by employing elastic or resilient means, in place of the compression springs 23, that exhibit a fully relaxed or unstressed condition associated with a predetermined dimension thereof, and the blind holes 22 and the blocks 20 are adjusted to a depth such that the depth of both facing blind holes 22 plus the desired spacing between the blocks 20 in the unclamped position equals the said predetermined dimension of the unstressed resilient means. As a consequence, when the blocks are released, all of the stressed, separating resilient means will relax until a condition is achieved when no further stresses remain. This condition can only be achieved when each pair of blocks 20 are separated by the desired spacing. If one space remains too small, it means that the resilient means associated therewith are not fully relaxed, and the forces resulting when the resilient means does unstress are sufficient to displace the blocks 20 until the space has enlarged to the required amount.

I have satisfactorily used, in accordance with this feature of the invention, hard rubber plugs, for example, of the order of 70 durometer, as the resilient means. As illustrated in FIG. 5, a rubber plug 23a is mounted between each pair of the blocks 20 and seated in the facing blind holes 22. The plug 23a, for instance, had an O.D. of ¼ inch and a length ⅝ inch, providing a gap of ⅛ inch between the blocks. The plugs 23a are cut very accurately to length, the dimension 52 in the drawing, so that it exactly fills the blind holes 22, in unstressed condition, when the blocks 20 are fully separated. In other words, the length 52 of the unstressed plug 23a is exactly equal to the combined depth of both blind holes 22 plus the desired spacing 53 between the blocks 20. The spacing between the end journals 9 and 13 is adjusted so that, in the open position, the receiving spaces 24 open an amount such that the foregoing length condition is maintained. For example, which is not to be considered as limiting, for a terminal thickness of ¹⁄₁₆ inch, the open spacing is selected as ⅛ inch. The blind hole depths are chosen as ¼ inch each. Thus, the plug 23a is given an unstressed length of ⅝ inch.

When the blocks clamp the terminals together in the closed position, the rubber plugs 23a are, of course, compressed. When the blocks are released, the resilient plugs 23a expand to their unstressed full length of ⅝ inch, separating each pair of blocks by the same ⅛ inch. The blocks, which slide freely on the transverse rods 17, quickly and easily separate, allowing the terminals 26 to be completely released for ready removal.

While I have described my invention in connection with specific embodiments and applications, other modifications thereof will be readily apparent to those skilled in the art without departing from the spirit and scope of the invention as defined in the appended claims.

What is claimed is:

1. A terminal holding device adapted for testing wire connections to terminals, comprising a support, a rotatable mandrel having a longitudinal axis journaled in the support, said mandrel including longitudinally extending guide means rotatable with the mandrel, an assembly of longitudinally aligned blocks mounted on said guide means and rotatable therewith and being freely slideable along the guide means, resilient means mounted between and engaging each pair of adjacent blocks and urging them apart in the absence of a clamping force to form plural receiving spaces between the blocks each for receiving a test terminal, means for urging the blocks in a longitudinal direction toward one another to clamp the test terminals therebetween, means for releasing the blocks to allow removal of the test terminals, means for rotating the mandrel and thus the assembly of blocks about the longitudinal axis, and means for locking the mandrel against rotation.

2. A device as set forth in claim 1 and including means for adjusting the size of the intervening receiving spaces.

3. A terminal holding device adapted for testing wire connections to terminals, comprising a support, a rotatable mandrel journaled in the support and rotatable about an axis, said mandrel including transverse guide means extending parallel to the axis, an assembly of blocks mounted on said guide means each through an aperture passing completely through the block and accommodating the guide means and being freely slideable along the guide means, resilient means mounted between and engaging each pair of adjacent blocks and in the absence of a clamping force urging them apart to form plural receiving spaces between the blocks each for receiving a test terminal having opposed ends, means mounted on the mandrel for urging the blocks toward one another in the direction of the of the axis to clamp the test terminals therebetween, said means including a follower pin secured to a block at one end of the assembly and a cam having a protruding region for engaging the follower pin and urging the said end block toward the adjacent block pushing and clamping the blocks tightly together, means for actuating the cam to engage the follower pin with the said protruding region and to disengage same, and means for locking the mandrel against rotation and for selectively releasing the mandrel to rotate same at least over an arc of 180°.

4. A device as set forth in claim 3 wherein the resilient means is a rubber plug member.

5. A device as set forth in claim 3 wherein said follower pin is controllably displaceable relative to said block at said one end to control the size of the receiving spaces formed between the blocks.

6. A device for testing wrapped wire connections to plural terminals, comprising a mandrel rotatable about an axis, said mandrel comprising a pair of guide rods extending parallel to said axis, a plurality of axially-aligned blocks each having a pair of through-holes engaged by the guide rods and slidable thereon and rotatable therewith and including and end block, a plurality of resilient members at least one of which is mounted between adjacent blocks in facing blind holes therein and urging the blocks apart to form between adjacent blocks at least one receiving space for a terminal and thus plural receiving spaces between the plurality of blocks, means for clamping the blocks together to lock the terminals inserted in the receiving spaces between the blocks and means for unclamping the blocks, said clamping means comprising a cam member adjacent the end block and means for moving the cam member from a first position wherein it is disengaged from the end block to a second position wherein it engages the end block and urges it strongly toward the remaining blocks, said clamping means being mounted on the mandrel and being rotatable therewith, and means for selectively rotating the mandrel about said axis, said rotating means including means for locking the mandrel in a position to receive the terminals and means for unlocking the mandrel enabling it to be rotated at least 180° to a new position.

7. A device as set forth in claim 6 wherein the clamping means includes a follower member adjustably coupled to control its length to the said end block at one end and engageable by the cam member at its opposite end.

8. A device as set forth in claim 7 wherein the follower member is mounted on the mandrel and extends along the axis of the mandrel in a direction away from the blocks.

9. A device as set forth in claim 6 wherein the resilient members are hard rubber plugs each having a length equal to the combined depths of the facing blind holes plus the size of the intervening terminal receiving space when the blocks are unclamped.

10. A device as set forth in claim 6 wherein the mandrel locking means includes a biased plunger extending transverse to the mandrel axis and adapted to engage a locking receptacle in the mandrel.

References Cited by the Examiner

UNITED STATES PATENTS

| | | | |
|---|---|---|---|
| 698,482 | 4/1902 | Erickson | 269—153 |
| 1,555,090 | 9/1925 | Wickersham | 269—153 |
| 2,227,443 | 1/1941 | Denner | 269—63 |
| 2,349,291 | 5/1944 | Meister | 269—153 |
| 2,415,520 | 2/1947 | Obecny | 269—157 |
| 2,578,126 | 12/1951 | Charipar | 269—153 |
| 2,746,218 | 5/1956 | Bowie | 51—216 |

FOREIGN PATENTS 636,646  5/1950  Great Britain.

HAROLD D. WHITEHEAD, *Primary Examiner.*